Patented Sept. 15, 1936

2,054,300

UNITED STATES PATENT OFFICE 2,054,300

PRESERVATION OF CELLULOSE XANTHATE

George A. Richter, Berlin, N. H., assignor to Brown Company, Berlin, N. H., a corporation of Maine No Drawing. Application March 30, 1935, Serial No. 13,990

21 Claims. (Cl. 260—100)

This invention relates to the preservation of cellulose xanthate so that it can be stored for a long period of time or shipped long distances without being spoiled. It relates more especially to a practice which involves delaying without ill effect the use of cellulose xanthate either in crumb or solution form for a period of time resulting in the spoilage of the xanthate under room temperature conditions.

In making cellulose xanthate, it is the practice to form so-called alkali cellulose by steeping sheets of wood pulp or equivalent raw material in caustic soda solution of about 18% strength and at about 18° C. and then pressing the sheets to the appropriate solution content, say, about 200% of the weight of the pulp. The sheets are then shredded and the shreds or crumbs of alkali cellulose are aged for about two or three days preparatory to xanthation at about room temperature with the appropriate amount of carbon bisulphide. The resulting moist xanthate crumbs are of a characteristic amber or orange color and are soluble in dilute caustic soda solution to form a viscose or cellulose xanthate solution. Thus, the usual viscose solution used for spinning into artificial silk is prepared so as to contain in solution about 7% to 8% cellulose and about 6% to 8% caustic soda.

It is known that moist cellulose xanthate crumbs and/or the viscose solution prepared therefrom are unstable and may be spoiled if kept for only a few days at room temperature. Indeed, in ripening viscose solution or syrup for spinning into artificial silk, it is necessary to control carefully the temperature under which the ripening operation is conducted in order to prevent gelling and spoilage of the solution. The moist cellulose xanthate crumbs also tend to become insoluble in caustic soda solution in comparatively short order when kept at room temperature. This unstability of cellulose xanthate is probably due to the tendency for sulphur groups to split out from the cellulose xanthate, the decomposition being in the direction of regenerating the cellulose.

I have found that cellulose xanthate in the form of undissolved xanthate crumbs or in the form of a viscose or xanthate solution can be preserved in unspoiled condition for a comparatively long period of time, that is, for many weeks and even months, if the xanthate is kept at sub-zero (0° C.) temperature conditions. Cellulose xanthate crumbs so preserved can be dissolved without difficulty in caustic soda solution in the same way as the freshly prepared crumbs; and a frozen viscose solution can be thawed out to a fluent or ungelled state such as is possessed by the freshly prepared solution. Evidently, sub-zero temperature conditions not only stop undesirable chemical decomposition but preserve the xanthate otherwise substantially unaltered so that it can yield solutions of the desired fluency or workability and other characteristics. The xanthate may be kept or preserved at various degrees of sub-zero (0° C.) frigidity all the way down to the temperatures reached with such present-day available refrigerants as solid carbon dioxide (dry ice) without being spoiled. Thus, temperatures of, say, −20° to −30° C. are better for the purpose of the present invention than, say, −5° C.

The principles of the present invention may be applied to cellulose xanthate crumbs in moist condition prepared according to the usual practice of xanthation hereinbefore described and hence completely alkali-soluble, that is, soluble in dilute caustic soda solution. In such case, the moisture or water content of the crumbs, which is known to promote decomposition or hydrolysis of the xanthate, is frozen and thus rendered impotent as a promoter of decomposition. The sub-zero (0° C.) temperature conditions necessary for this purpose may be realized by placing the xanthate crumbs promptly or soon after preparation in suitable closed containers and surrounding the containers with a low-temperature refrigerant, such as solid carbon dioxide, the refrigerant being replenished as needed, to maintain the crumbs frozen until desired for use. It is desirable to compress the mass of xanthate crumbs into a block or cake in order to promote freezing and conserve refrigerant in shipping. In some instances, however, it may be desirable to extract the moisture content of the freshly prepared xanthate crumbs as well as the impurities present therein with suitable inert, water-miscible organic liquids, such as alcohol or acetone, whereupon the extracted product may be promptly refrigerated to the appropriately low preserving temperature. Extraction may be effected by steeping the crumbs in the organic liquid, removing excess organic liquid by centrifugation, and chilling the crumbs with their residual organic liquid content to the desired low temperature, such organic liquid content being frozen, if desired. If desired, part or all of the moisture content of the freshly prepared xanthate crumbs may be evaporated under vacuum and at sufficiently low temperature to prevent their decomposition. Before dehydration, the xanthate crumbs may contain about 40% moisture; and dehydration may be carried to a sufficient degree to reduce this moisture content materially or to eliminate water altogether from the xanthate. In the substantial absence of moisture, the cellulose xanthate crumbs have greater stability, wherefore, the substantially dehydrated crumbs need not be refrigerated to as low a temperature as moist crumbs in order to be kept substantially unspoiled for a given long period of time. Indeed, xanthate that has been partly or substantially completely dried is improved by freezing by reason of the fact that freezing removes residual active or liquid water from the sphere of potential decomposing or hydrolyzing action and also prevents such decomposition or hydrolysis of the xanthate as might otherwise be occasioned through absorption by the xanthate of moisture or water from the moisture of the surrounding atmosphere.

The frozen xanthate may be prepared in accordance with the present invention in the form of a substantially alkali-free product or one containing alkali lower in amount than the usual cellulose xanthate. It is to be noted that cellulose xanthate crumbs as well as viscose solutions normally carry a rather high percentage of free caustic soda. In xanthate crumbs, for instance, there is usually present about 12 to 15% of free caustic soda, based on the moisture content of the crumbs. This percentage of free caustic soda is an excess which remains in the xanthated product after the carbon bisulphide has reacted with the soda-cellulose; and such free caustic soda is considered in the calculation of water and additional caustic soda subsequently to be used in preparing a usual or ordinary viscose solution. The usual or ordinary viscose solution has a caustic soda content of about 6.5% and a cellulose content of about 7%, both contents being based on the solution as a whole. The caustic soda is usually desired in the solution or syrup so as to impart thereto a reasonable degree of stability, that is, so that the solution will not gel with undue rapidity. In the absence of free or excess caustic soda, such as has been described, hydrolysis and spoilage of cellulose xanthate both in crumb and solution form take place quite rapidly particularly under room temperature conditions.

When the moisture or water content of cellulose xanthate either in crumb or solution form is frozen in accordance with the present invention, it is possible to reduce the free caustic soda content of the xanthate and also to purify the xanthate without spoilage. In the case of cellulose xanthate crumbs, it is possible to rid the crumbs of excess or free caustic soda and also to remove inorganic sodium-sulphur compounds from the crumbs and thereby to purify them by treating them with a solution of weak acid or weak acid salt, for instance, a solution of sodium bicarbonate or acetic acid. After the free caustic soda content of the crumbs has been neutralized by such treatment, the crumbs may be washed or purified without substantially affecting the solubility of the resulting purified xanthate crumbs in dilute caustic soda solution. The purified xanthate crumbs may be dissolved in dilute caustic soda solution to form a viscose solution and the resulting viscose solution, which may be of distinctly lower causticity than the usual or ordinary viscose solution hereinbefore mentioned, may be frozen to solid block form and kept refrigerated in such form until it is to be used, at which time it may be melted to reproduce substantially the original viscose solution, that is, the solution had immediately before freezing. If desired, the melted viscose solution may be improved in stability by the addition thereto of some caustic soda, particularly when it is to stand for some period of time in unfrozen solution form prior to use. The purified xanthate crumbs tend to decompose very rapidly in the presence of water, but, by subjecting purified moist crumbs to a freezing operation in accordance with the present invention promptly after their purification, it is possible to avoid the decomposition or hydrolysis otherwise fostered by the liquid or unfrozen water. Of course, not all the free caustic soda content of the original xanthate crumbs need be removed by neutralization and purification. On the contrary, in some instances, the original xanthate crumbs may undergo an acidification treatment and washing designed to effect a material reduction in their alkali content even though they remain distinctly alkaline after such treatment and washing, whereupon the partly neutralized and washed crumbs may be frozen as already described and kept substantially unimpaired in such condition until ready for dissolution to form a viscose solution. Rather than neutralizing partly or completely the original xanthate crumbs, they may be dissolved in plain water or water containing less alkali than that normally used. In other words, essentially only the free alkali content of the original crumbs may appear in the viscose solution prepared from the crumbs, thereby reducing the amount of caustic soda used in preparing the viscose solution so that the resulting viscose solution is one containing much less caustic soda than cellulose, say, one whose caustic soda content is one-half or a smaller fraction of its cellulose content. As already indicated, a viscose solution of such reduced free caustic soda content is less stable than a normal solution, but, by freezing such a solution promptly after preparation, it is possible to avoid hydrolysis or decomposition such as would otherwise ensue in the solution. Upon thawing out such a viscose solution, caustic soda may be added thereto, as already indicated, to improve its stability, particularly when some delay is to be encountered in the use of the solution.

When viscose solutions are frozen in accordance with the present invention, it may be preferable to freeze and store them at a cellulose concentration markedly higher than that of the usual viscose solutions prepared for spinning or casting operations. Thus, viscose solutions may be prepared in accordance with the present invention at cellulose concentrations of, say, 10% to 20% or greater and frozen in such concentrated condition, thereby effecting a saving in the cost of freezing the solution and maintaining it frozen during storage as well as providing a more concentrated solution lending itself to more economical storage and/or shipment in frozen condition. When such a concentrated frozen solution is melted for use, the user can readily dilute it to the desired degree so that it can serve its intended purpose. The advantage of producing such a frozen concentrated solution as compared with frozen xanthate crumbs lies in the fact that a purchaser receiving the frozen crumbs must be equipped with special apparatus for dissolving the crumbs, whereas it is much easier to dilute a melted viscose solution or syrup of high concentration, since such latter practice requires an ordinary mixing tank and the mere addition of plain water to the melted solution.

The principles of the present invention may also be applied in the preservation of the usual substantially clear viscose or cellulose xanthate solutions, in which case, the freshly prepared solution may be frozen as a solid block or cake substantially free from unfrozen water and from undissolved or undispersed cellulose or cellulose xanthate, and the solid mass may be kept for many weeks without observable change in characteristics upon its being thawed out. In order to freeze the ordinary viscose solution hereinbefore described as being used in artificial silk manufacture, it is necessary to go to temperatures appreciably below 0° C. so as to transform substantially all of its water content into ice. Such low temperature refrigerants as solid carbon dioxide can to advantage be used for this purpose. In some instances, the desired refrigeration or freezing of the xanthate solution may be advantageously effected by delivering the solution continuously to so-called chilling rolls such as are used to freeze lard or similar edibles, the solution or syrup being deposited continuously as a thin film on the refrigerated roll surface and, after being frozen, being continuously scraped from such surface, placed in containers or a refrigerator, and kept frozen until desired for use.

The present invention thus makes possible the sale and shipment of cellulose xanthate as an article of commerce. This is of decided commercial importance, inasmuch as there are potential users of cellulose xanthate who need cellulose xanthate in such comparatively small amount that it does not pay them to install the equipment necessary for its preparation. Other manufacturers have not the experience or technical staff necessary for undertaking the preparation of cellulose xanthate. By my invention, it becomes possible for a manufacturer engaged in the preparation of cellulose xanthate to market such product, as the product can be kept in an unspoiled condition while it is being shipped long distances; and the consumer can lay in an inventory of cellulose xanthate and keep it in perfectly good condition until he is ready to use it. The shipment of moist cellulose xanthate crumbs in frozen condition presents the advantages of comparatively low slipping weight and volume over the shipment of frozen viscose solution, but in those instances when the consumer is a small user, he might prefer to receive the xanthate in dissolved or solution form and thus be enabled to dispense with the bother and technical skill incident to dissolving xanthate crumbs and forming xanthate solutions of appropriate composition.

In some instances the xanthate either in the form of crumbs or as a viscose solution may be ripened to the desired degree before freezing. Inasmuch as the xanthate does not appear to change significantly in degree of ripeness or maturity during storage in frozen condition, the xanthate immediately upon being thawed out has a degree of ripeness or maturity appropriate for the purpose for which ripening was effected. Thus, initial ripening of the xanthate or viscose syrup may be carried out in the usual manner to a stage such as makes for satisfactory spinning of the solution into artificial silk or casting of the solution into films, whereupon the ripened syrup may be frozen as solid flakes or chips and, after storage, thawed out to produce at once a solution ready for spinning or casting. In other words, the refrigerated mass of frozen, solid flakes or chips of viscose may be of such composition and maturity as to yield immediately upon thawing a viscose solution suitable for spinning or casting.

Besides enabling the keeping or storage of cellulose xanthate over a period of time resulting in the spoilage of xanthate under room temperature conditions, the present invention makes possible a keeping or storage of a batch of xanthate at a given maturity or ripeness even though the keeping or storage period may not be so long as to cause actual spoilage but sufficiently long to alter appreciably the degree of maturity or ripeness of the batch under room or approximately room temperature conditions. Thus, a manufacturer of rayon or other viscose products may find it desirable to hold a batch of xanthate, for instance in syrup form, over from one day to another without measurable change in its maturity or ripeness; and, by refrigerating or freezing the xanthate as hereinbefore described, he is enabled to do this very thing even though the hold-over period is so short as not to effect actual spoilage of the xanthate but merely noteworthy change in its ripeness under room or approximately room temperature conditions.

I claim:—

1. In a practice which involves delaying without ill effect the use of cellulose xanthate for a period of time ranging from days to weeks and resulting in the spoilage of cellulose xanthate under room temperature conditions, that improvement which comprises chilling the cellulose xanthate promptly after preparation to sub-zero (0° C.) temperature and keeping the xanthate under such temperature substantially throughout such period of time to avoid spoilage thereof.

2. In a practice which involves delaying without ill effect the use of cellulose xanthate crumbs for a period of time ranging from days to weeks and resulting in the spoilage of such crumbs under room temperature conditions, that improvement which comprises chilling such crumbs promptly after preparation to sub-zero (0° C.) temperature resulting in the freezing of such water as is associated with the crumbs and keeping the crumbs under such temperature substantially throughout such period of time to avoid spoilage thereof.

3. In a practice which involves delaying without ill effect the use of a cellulose xanthate solution for a period of time ranging from days to weeks and resulting in the spoilage of such solution under room temperature conditions, that improvement which comprises freezing the solution promptly after preparation to a solid condition and keeping the solution frozen substantially throughout such period to avoid spoilage thereof.

4. In a practice which involves delaying without ill effect the use of cellulose xanthate crumbs for a period of time ranging from days to weeks and resulting in the spoilage of the crumbs under room temperature conditions, that improvement which comprises dehydrating the freshly xanthated crumbs, promptly chilling the dehydrated crumbs to sub-zero (0° C.) temperature, and keeping the crumbs at such temperature substantially throughout such period of time to avoid spoilage thereof.

5. In a practice which involves delaying without ill effect the use of cellulose xanthate crumbs for a period of time ranging from days to weeks and resulting in the spoilage of such crumbs under room temperature conditions, that improvement which comprises extracting with an organic solvent the water content of the freshly xanthated crumbs, chilling the xanthated crumbs to sub-zero (0° C.) temperature, and keeping the crumbs under such temperature substantially throughout such period of time to avoid spoilage thereof.

6. In a practice which involves delaying without ill effect the use of ripened cellulose xanthate for a period of time ranging from days to weeks and resulting in the spoilage of such xanthate under room temperature conditions, that improvement which comprises ripening the xanthate to the desired stage of maturity, freezing the xanthate promptly after ripening, and keeping the xanthate frozen substantially throughout such period to avoid spoilage thereof.

7. In a practice which involves delaying the use of cellulose xanthate for a period of at least some days, steps which comprise chilling, preparatory to such delay, the cellulose xanthate to sub-zero (0° C.) temperature to freeze substantially all of the water associated therewith and then keeping the xanthate under such temperature substantially throughout such period of delay to avoid undesirable change therein.

8. In a practice which involves delaying the use of cellulose xanthate solution for a period of at least some days, steps which comprise freezing, preparatory to such delay, the solution to a solid condition substantially free from liquid water and then keeping the solution thus frozen substantially throughout such period of delay to avoid undesirable change therein.

9. A refrigerated cellulose xanthate substantially free from unfrozen water and sufficiently stable to be kept unspoilt in such condition for weeks.

10. A frozen viscose substantially free from unfrozen water and from undissolved cellulose or cellulose xanthate and sufficiently stable to be kept unspoilt in such condition for weeks.

11. A step-product in the manufacture of viscose from completely alkali-soluble cellulose xanthate crumbs, comprising such crumbs in such highly refrigerated condition as to be of sufficiently unchanging maturity to be kept in such condition for weeks.

12. As an article of commerce, a refrigerated compressed block or cake of cellulose xanthate substantially free from unfrozen water.

13. As an article of commerce, a refrigerated block of frozen viscose substantially free from unfrozen water and from undissolved cellulose or cellulose xanthate and of sufficiently unchanging degree of maturity in such frozen condition as to be kept in such condition for weeks.

14. As an article of commerce, a refrigerated mass of frozen, solid flakes or chips of viscose of such stability as to be kept unspoilt for weeks and of such composition and maturity as to yield immediately upon thawing viscose solution suitable for spinning or casting.

15. A substantially stable, frozen cellulose xanthate substantially free from unfrozen water and containing materially less than 40% of ice.

16. As an article of commerce, a refrigerated mass of frozen cellulose xanthate containing materially less than 40% of ice but permeated with an inert, water-miscible organic liquid.

17. As an article of commerce, a refrigerated compressed block or cake of cellulose xanthate substantially free from alkali and from unfrozen water.

18. As an article of commerce, a refrigerated block of frozen viscose whose caustic soda content is much less than its cellulose content.

19. In a practice which involves delaying the use of cellulose xanthate for a period of at least some days, steps which comprise dissolving the freshly xanthated cellulose wherein free caustic soda is present, promptly after preparation in water to produce a solution containing caustic soda in amount much less than cellulose, chilling the solution promptly after preparation to sub-zero (0° C.) temperature to freeze substantially all of the water associated therewith, and keeping the solution frozen substantially throughout such period of delay to avoid undesirable change therein.

20. In a practice which involves delaying the use of cellulose xanthate for a period of at least some days, steps which comprise treating the freshly xanthated cellulose, wherein free caustic soda is present, promptly after preparation with a solution of weak acid to neutralize at least partly said alkali content, washing the so treated xanthated cellulose to purify it, chilling it to sub-zero (0° C.) temperature to convert to solid condition substantially all such water as is associated therewith, and keeping the xanthate thus chilled substantially throughout such period of delay to avoid undesirable change therein.

21. As an article of commerce, a refrigerated block of frozen viscose whose caustic soda content is much less than its cellulose content and whose cellulose content is at least 10%.

GEORGE A. RICHTER.